(12) United States Patent
Wei

(10) Patent No.: US 10,139,665 B2
(45) Date of Patent: Nov. 27, 2018

(54) MULTIPLE VIEWING-FIELD DISPLAY COMPONENT, PATTERNED SHIELDING LAYER AND MULTIPLE VIEWING-FIELD DISPLAY APPARATUS

(71) Applicant: BOE TECHNOLOGY GROUP CO., LTD., Beijing (CN)

(72) Inventor: Wei Wei, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 15/123,947

(22) PCT Filed: May 13, 2015

(86) PCT No.: PCT/CN2015/078873
§ 371 (c)(1),
(2) Date: Sep. 6, 2016

(87) PCT Pub. No.: WO2016/110034
PCT Pub. Date: Jul. 14, 2016

(65) Prior Publication Data
US 2017/0017110 A1    Jan. 19, 2017

(30) Foreign Application Priority Data

Jan. 8, 2015 (CN) .......................... 2015 1 0010044

(51) Int. Cl.
*G02F 1/1335* (2006.01)
*A63F 13/25* (2014.01)
(Continued)

(52) U.S. Cl.
CPC ........ *G02F 1/133512* (2013.01); *A63F 13/25* (2014.09); *G02B 27/2214* (2013.01);
(Continued)

(58) Field of Classification Search
None
See application file for complete search history.

(56) References Cited

U.S. PATENT DOCUMENTS 5,311,337 A * 5/1994 McCartney, Jr. ........................... G02F 1/133514
349/109
5,953,148 A 9/1999 Moseley et al.
(Continued)

FOREIGN PATENT DOCUMENTS

CN        1725274 A    1/2006
CN      101373300 A    2/2009
(Continued)

OTHER PUBLICATIONS

Fourth Chinese Office Action, for Chinese Patent Application No. 201510010044.7, dated Jan. 2, 2018, 33 pages.
(Continued)

*Primary Examiner* — Ashok Patel
(74) *Attorney, Agent, or Firm* — Kinney & Lange, P.A.

(57) ABSTRACT

Embodiments of the present disclosure provides a multiple viewing-field display component, a patterned shielding layer for a multiple viewing-field display apparatus and a multiple viewing-field display apparatus including the multiple viewing-field display component. The multiple viewing-field display component includes a plurality of multiple viewing-field pixels each including a plurality of sub-pixels corresponding to a plurality of viewing fields, each sub-pixel having a substantially triangular shape. In embodiments of the present disclosure, an arrangement of triangular sub-pixels is applied for enabling multiple viewing-field display with high brightness and low crosstalk, for example.

23 Claims, 15 Drawing Sheets

(51) Int. Cl.
*G09F 9/30* (2006.01)
*G02B 27/22* (2018.01)
*G07F 17/32* (2006.01)

(52) U.S. Cl.
CPC ............... *G07F 17/32* (2013.01); *G09F 9/30* (2013.01); *G02F 2201/123* (2013.01)

(56) References Cited

U.S. PATENT DOCUMENTS

| | | | |
|---|---|---|---|
| 8,154,568 B2* | 4/2012 | Chou | G02B 5/201 345/695 |
| 8,648,971 B2 | 2/2014 | Ishikawa et al. | |
| 9,368,062 B2* | 6/2016 | Zhang | G02F 1/167 |
| 9,799,253 B2* | 10/2017 | Wang | G09G 3/2003 |
| 2006/0087713 A1* | 4/2006 | Whitehead, Jr. | G02F 1/133514 359/254 |
| 2010/0134909 A1* | 6/2010 | Lin | G02B 5/201 359/891 |
| 2013/0070188 A1 | 3/2013 | Ishikawa et al. | |
| 2013/0249377 A1* | 9/2013 | Hamer | G09G 3/2003 313/112 |
| 2014/0240475 A1* | 8/2014 | Shigemura | H04N 13/0406 348/59 |
| 2015/0212367 A1* | 7/2015 | Wang | G02F 1/133514 349/108 |

FOREIGN PATENT DOCUMENTS

| | | | |
|---|---|---|---|
| CN | 101930207 A | * | 12/2010 |
| CN | 101930207 A | | 12/2010 |
| CN | 102090070 A | | 6/2011 |
| CN | 102625112 A | | 8/2012 |
| CN | 104007555 A | | 8/2014 |
| CN | 104037199 A | | 9/2014 |
| CN | 104102043 A | | 10/2014 |
| CN | 104111538 A | | 10/2014 |
| CN | 104147781 A | | 11/2014 |
| CN | 104517541 A | | 4/2015 |
| CN | 204463716 U | | 7/2015 |
| EP | 0833184 A1 | | 4/1998 |
| JP | 3387900 B2 | | 3/2003 |
| WO | 2012148729 A2 | | 11/2012 |
| WO | 2013064971 A2 | | 5/2013 |

OTHER PUBLICATIONS

Third Chinese Office Action, for Chinese Patent Application No. 201510010044.7, dated Jul. 12, 2017, 22 pages.
First Chinese Office Action and English translation dated Aug. 12, 2016, for corresponding Chinese Application No. 201510010044.7.
International Search Report and Written Opinion (including English translation of Box V) dated Sep. 28, 2015, for corresponding PCT Application No. PCT/CN2015/078873.
Second Chinese Office Action and English translation dated Jan. 12, 2017, for corresponding Chinese Application No. 201510010044.7.
Extended European Search Report dated Jul. 27, 2018, for corresponding European Application No. 15876540.4.

* cited by examiner

MULTIPLE VIEWING-FIELD DISPLAY COMPONENT, PATTERNED SHIELDING LAYER AND MULTIPLE VIEWING-FIELD DISPLAY APPARATUS

CROSS-REFERENCE TO RELATED APPLICATION

This application is a Section 371 National Stage Application of International Application No. PCT/CN2015/078873, filed on 13 May 2015, entitled "MULTIPLE VIEWING-FIELD DISPLAY COMPONENT, PATTERNED SHIELDING LAYER AND MULTIPLE VIEWING-FIELD DISPLAY APPARATUS" and which claims priority to Chinese Application No. 201510010044.7, filed on 8 Jan. 2015, incorporated herein by reference in their entirety.

BACKGROUND

Technical Field

Embodiments of the present disclosure relate to a multiple viewing-field display component, a patterned shielding layer and a multiple viewing-field display apparatus.

Description of the Related Art

A grating or a patterned shielding layer having a light transmission region or opaque region is utilized in a traditional double viewing-field display apparatus, for forming a double viewing-field effect.

SUMMARY

An object of embodiments of the present disclosure is to provide a multiple viewing-field display component, a patterned shielding layer and a multiple viewing-field display apparatus, for enabling multiple viewing-field display with high brightness, low crosstalk and/or high resolution, for example.

According to an embodiment of the present disclosure, there is provided a multiple viewing-field display component, comprising a plurality of multiple viewing-field pixels each comprising a plurality of sub-pixels corresponding to a plurality of viewing fields, each sub-pixel having a substantially triangular shape.

According to an embodiment of the present disclosure, the multiple viewing-field display component is configured to display N viewing fields, where N is an integer greater than or equal to three, and each triangular sub-pixel has a vertex and a base opposite to the vertex, and N triangular sub-pixels form a polygon having N sides, such that the vertexes of the triangular sub-pixels are located close to a center of the polygon and the bases of the triangular sub-pixels form N sides of the polygon.

According to an embodiment of the present disclosure, the sub-pixels of each multiple viewing-field pixel corresponding to the N viewing fields form M polygons, and M sub-pixels of the M polygons located at the same angle orientation or clock position with respect to respective centers of the polygons are sub-pixels having different colors.

According to an embodiment of the present disclosure, the multiple viewing-field display component further comprises: a patterned shielding layer configured to form the plurality of viewing fields by light coming from the plurality of multiple viewing-field pixels, the patterned shielding layer having a plurality of light transmission regions.

According to an embodiment of the present disclosure, when viewed in a direction perpendicular to the patterned shielding layer, a peripheral edge of each of the plurality of light transmission regions is arranged to surround a center of a corresponding one of the polygons.

According to an embodiment of the present disclosure, when viewed in a direction perpendicular to the patterned shielding layer, a center of each of the plurality of light transmission regions substantially coincides with the center of the corresponding polygon.

According to an embodiment of the present disclosure, each of the plurality of light transmission regions has a shape in form of one of square, circle, triangle and ellipse.

According to an embodiment of the present disclosure, each of the plurality of light transmission regions is formed into a polygon, and sides of the polygon formed by the light transmission region are equal in number to and substantially parallel to the sides of the polygon formed of the sub-pixels.

According to an embodiment of the present disclosure, the polygon formed by the light transmission region and the polygon formed of the sub-pixels are similar polygons.

According to an embodiment of the present disclosure, an area of each of the plurality of light transmission regions is 0.25% to 36% of an area of the polygon formed of the sub-pixels.

According to an embodiment of the present disclosure, when viewed in a direction perpendicular to the patterned shielding layer, the sub-pixels for one viewing field are located at the same side with respect to the plurality of light transmission regions respectively.

According to an embodiment of the present disclosure, the sub-pixel comprises an isosceles triangular sub-pixel.

According to an embodiment of the present disclosure, the polygon formed of the N triangular sub-pixels and having the N sides is a substantially regular polygon.

According to an embodiment of the present disclosure, the M polygons formed by the sub-pixels of each multiple viewing-field pixel corresponding to the N viewing fields are arranged adjacent to each other.

According to an embodiment of the present disclosure, the M polygons formed by the sub-pixels of each multiple viewing-field pixel corresponding to the N viewing fields are arranged in a row or a column.

According to an embodiment of the present disclosure, the M polygons formed by the sub-pixels of each multiple viewing-field pixel corresponding to the N viewing fields are arranged in a substantially L shape or V shape.

According to an embodiment of the present disclosure, the sub-pixels of each multiple viewing-field pixel corresponding to one of the viewing fields comprises three sub-pixels including a R sub-pixel, a G sub-pixel and a B sub-pixel; or the sub-pixels of each multiple viewing-field pixel corresponding to one of the viewing fields comprises four sub-pixels including a R sub-pixel, a G sub-pixel, a B sub-pixel and a Y sub-pixel; or the sub-pixels of each multiple viewing-field pixel corresponding to one of the viewing fields comprises four sub-pixels including a R sub-pixel, a G sub-pixel, a B sub-pixel and a W sub-pixel.

According to an embodiment of the present disclosure, the sub-pixels of each multiple viewing-field pixel corresponding to one of the viewing fields comprises three sub-pixels including a R sub-pixel, a G sub-pixel and a B sub-pixel; N is equal to four, and M is equal to three; and the M polygons formed by the sub-pixels of each multiple viewing-field pixel corresponding to the N viewing fields are arranged in a row or column.

According to an embodiment of the present disclosure, the sub-pixels of each multiple viewing-field pixel corresponding to one of the viewing fields comprises three sub-pixels including R sub-pixel, G sub-pixel and B sub-pixel; N is equal to four, and M is equal to three; and the M polygons formed by the sub-pixels of each multiple viewing-field pixel corresponding to the N viewing fields are arranged in a substantially L shape or V shape.

According to an embodiment of the present disclosure, the M polygons formed by the sub-pixels of one multiple viewing-field pixel and arranged in the substantially L shape or V shape and the M polygons formed by the sub-pixels of another multiple viewing-field pixel and arranged in the substantially L shape or V shape constitute a parallelogram or a rectangle, which forms a minimum sub-pixel arrangement cycle.

According to an embodiment of the present disclosure, the sub-pixels of each multiple viewing-field pixel corresponding to one of the viewing fields comprises four sub-pixels including a R sub-pixel, a G sub-pixel, a B sub-pixel and a Y sub-pixel, or the sub-pixels of each multiple viewing-field pixel corresponding to one of the viewing fields comprises four sub-pixels including a R sub-pixel, a G sub-pixel, a B sub-pixel and a W sub-pixel; N is equal to four, and M is equal to four; and the M polygons formed by the sub-pixels of each multiple viewing-field pixel corresponding to the N viewing fields are arranged in a square shape.

According to an embodiment of the present disclosure, there is provided a patterned shielding layer for a multiple viewing-field display apparatus, which is configured to form a plurality of viewing fields by light coming from multiple viewing-field pixels and comprises an area for display, and the area for display comprises a plurality of light transmission regions arranged in an array, and if the area for display is divided by straight lines into a plurality of identical regular polygons arranged in an array, a peripheral edge of each of the plurality of light transmission regions is arranged to surround a center of a corresponding one of the regular polygons.

According to an embodiment of the present disclosure, a center of each of the plurality of light transmission regions substantially coincides with the center of the corresponding one of the regular polygons.

According to an embodiment of the present disclosure, each of the plurality of light transmission regions has a shape in form of one of square, circle, triangle and ellipse.

According to an embodiment of the present disclosure, each of the plurality of light transmission regions is formed into a polygon, and sides of the polygon formed by the light transmission region are equal in number to and substantially parallel to sides of the corresponding regular polygon.

According to an embodiment of the present disclosure, the regular polygon is a regular triangle, and the straight lines comprise: a plurality of first straight lines arranged in parallel with each other and equidistantly spaced apart from each other at an interval; a plurality of second straight lines arranged in parallel with each other and equidistantly spaced apart from each other at an interval, the second straight lines being arranged at an angle of 60 degrees with respect to the first straight lines; and a plurality of third straight lines arranged in parallel with each other and equidistantly spaced apart from each other at an interval, the third straight lines being arranged at an angle of 60 degrees with respect to the second straight lines, and intersecting the second straight line at respective points on the first straight lines, the interval between the second straight lines being equal to the interval between the third straight lines.

According to an embodiment of the present disclosure, the regular polygon is a square, and the straight lines comprises: a plurality of first straight lines arranged in parallel with each other and equidistantly spaced apart from each other at an interval; and a plurality of second straight lines arranged in parallel with each other and equidistantly spaced apart from each other at an interval, the second straight lines being arranged at an angle of 90 degrees with respect to the first straight lines, the interval between the first straight lines being equal to the interval between the second straight lines.

According to an embodiment of the present disclosure, there is provided a multiple viewing-field display apparatus comprising the above multiple viewing-field display component or the above patterned shielding layer.

The multiple viewing-field display component, the patterned shielding layer and the multiple viewing-field display apparatus according to embodiments of the present disclosure can achieve multiple viewing-field display with high brightness, low crosstalk and/or high resolution, for example.

DETAILED DESCRIPTION OF PREFERRED EMBODIMENTS

Figure 1:
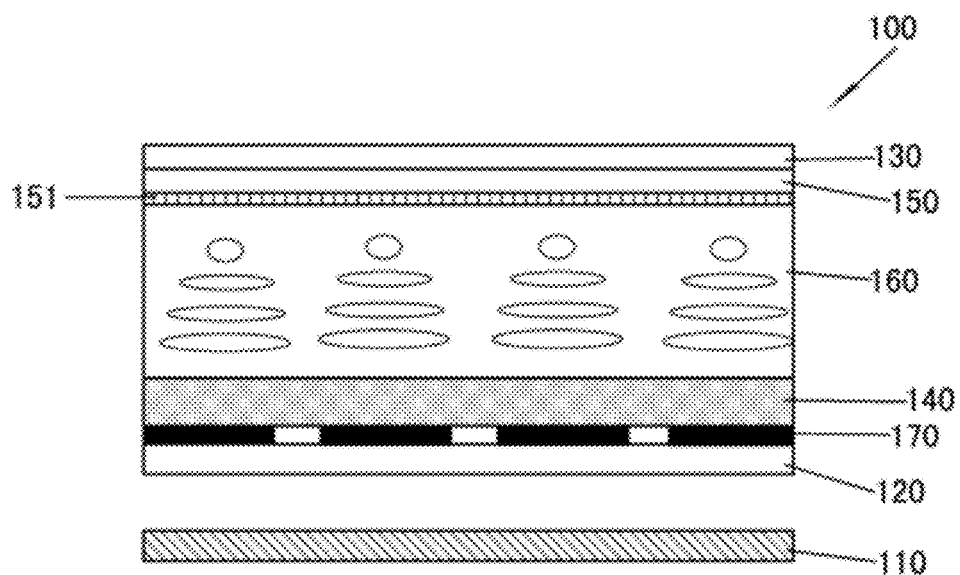
FIG. 1 is a schematic diagram of a multiple viewing-field display apparatus according to an embodiment of the present disclosure.

Exemplary embodiments of the present invention will be described hereinafter in detail with reference to the attached drawings. In addition, in the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

In the drawings, thicknesses, sizes and shapes of film layers and regions as shown do not reflect real scales of substrates, gratings and pixels, but are only intended to illustrate the contents of the present disclosure.

Figure 2:
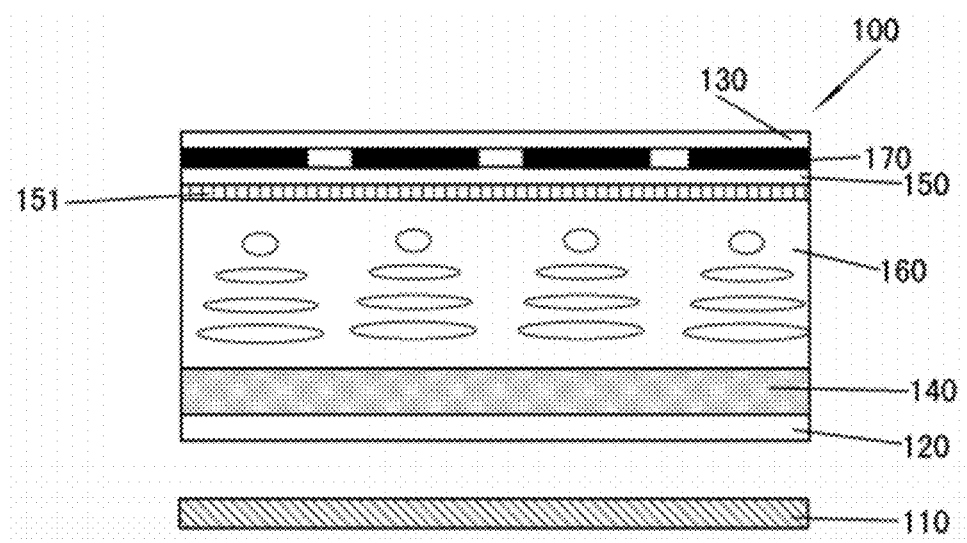
FIG. 2 is a schematic diagram of a multiple viewing-field display apparatus according to another embodiment of the present disclosure.

According to an embodiment of the present disclosure, as shown in FIGS. 1 and 2, a multiple viewing-field display apparatus 100 comprises a multiple viewing-field display component (which will be described in detail hereinafter). The multiple viewing-field display apparatus may be a multiple viewing-field liquid crystal display or the like.

In an example according to the present disclosure, as shown in FIG. 1, the multiple viewing-field display apparatus 100 comprises an array substrate 140; a color filter substrate 150 formed with a color filter layer 151; a liquid crystal layer 160 filled between the array substrate 140 and the color filter substrate 150; a first polarizer 120 and a second polarizer 130 provided respectively on an outer surface of the array substrate 140 and an outer surface of the color filter substrate 150; and a backlight source 110 disposed at an outer side of the array substrate 140 and configured to emit irradiation light toward the array substrate 140.

In an embodiment shown in FIG. 1, a grating or patterned shielding layer 170 is disposed on a side of the array substrate 140 facing away from the liquid crystal layer 160, between the first polarizer 120 and the array substrate 140. In an embodiment shown in FIG. 2, the grating or patterned shielding layer 170 is disposed on a side of the array substrate 140 facing the liquid crystal layer 160, between the second polarizer 130 and the color filter substrate 150. In addition, the grating or patterned shielding layer 170 may also be disposed between the array substrate 140 and the color filter substrate 150.

Further, the multiple viewing-field display component according to embodiments of the present disclosure may be applicable to any other suitable display apparatuses, for example, an organic light emitting diode (OLED) display apparatus, a plasma display apparatus and the like.

In the above exemplary display apparatus, pixels or pixel units and the grating or patterned shielding layer 170 constitute the multiple viewing-field display component according to embodiments of the present disclosure.

Figure 13:
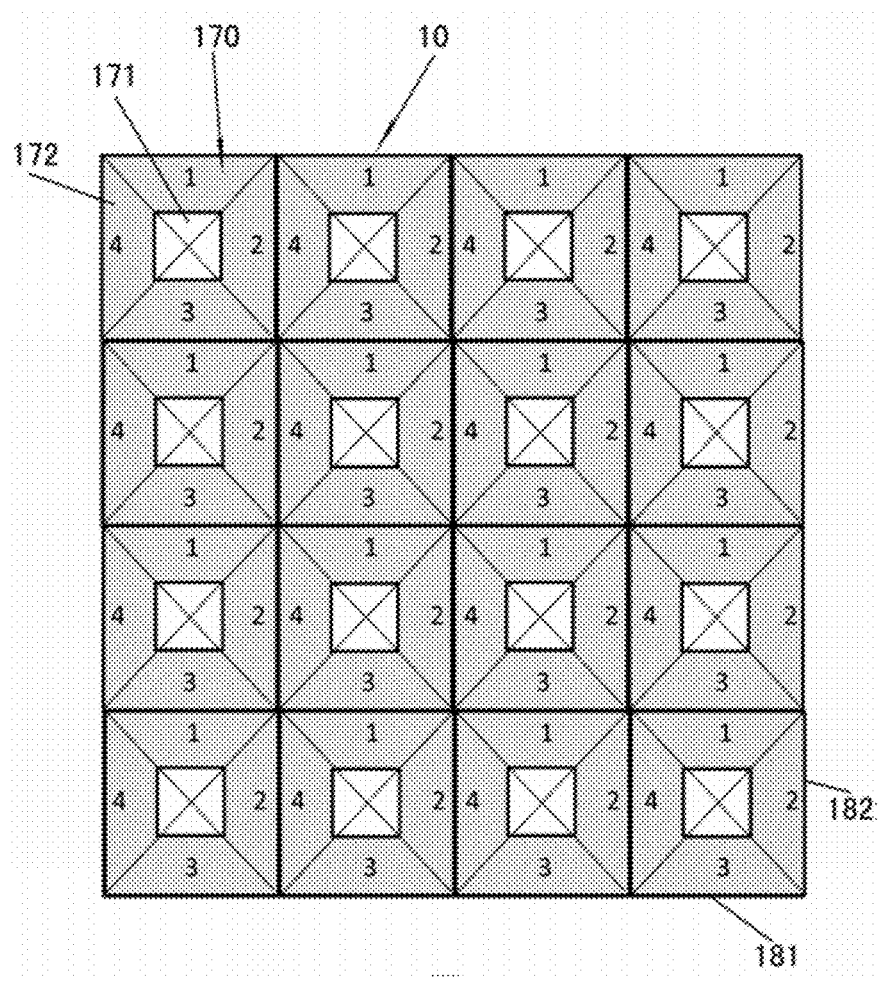
FIG. 13 is a schematic diagram of a grating or patterned shielding layer for four viewing-field display according to an embodiment of the present disclosure.
Figure 14:
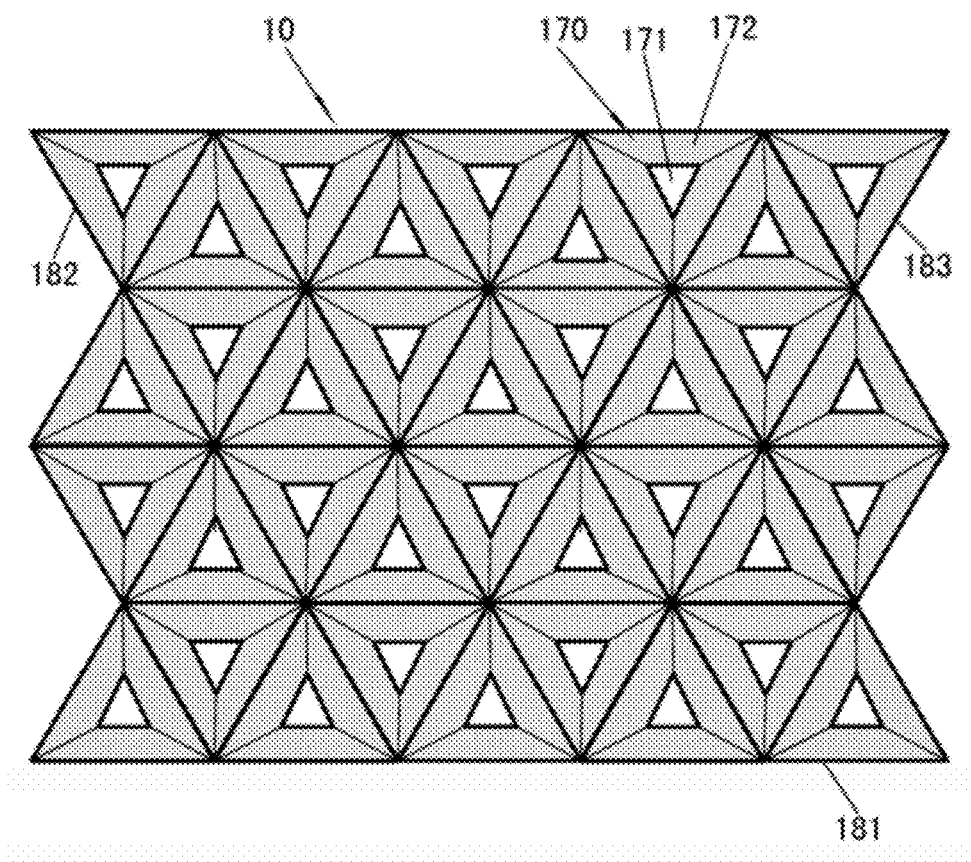
FIG. 14 is a schematic diagram of a grating or patterned shielding layer for three viewing-field display according to an embodiment of the present disclosure.

Referring to FIGS. 3 to 5 and FIGS. 13 and 14, the multiple viewing-field display component according to embodiments of the present disclosure comprises a plurality of multiple viewing-field pixels 10 each comprising a plurality of sub-pixels 11 corresponding to a plurality of viewing fields, and the sub-pixel 11 has a substantially triangular shape. For example, all sub-pixels 11 have a substantially triangular shape. The multiple viewing-field display component according to embodiments of the present disclosure may further comprise the grating or patterned shielding layer 170 configured to form the plurality of viewing fields by light coming from a plurality of multiple viewing-field pixels 10, that is, configured such that light coming from a plurality of multiple viewing-field pixels 10 and passing through the grating or patterned shielding layer 170 forms or defines the plurality of viewing fields, the grating or patterned shielding layer 170 having a plurality of light transmission regions or openings 171 and opaque regions 172 (which will be described in detail hereinafter). In FIGS. 13 and 14, the grating or patterned shielding layer 170 is disposed above the multiple viewing-field pixels 10, and numbers 1 to 4 shown in FIG. 13 indicate a first viewing field, a second viewing field, a third viewing field and a fourth viewing field, respectively.

Figure 3:
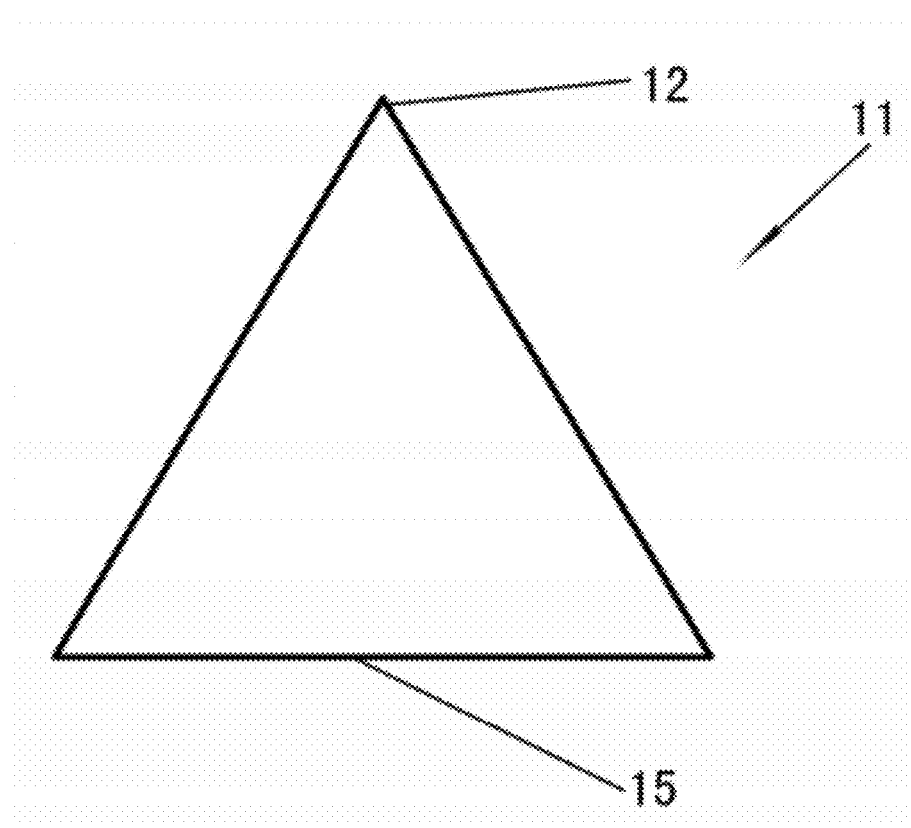
FIG. 3 is a schematic diagram of a sub-pixel according to an embodiment of the present disclosure.
Figure 4:
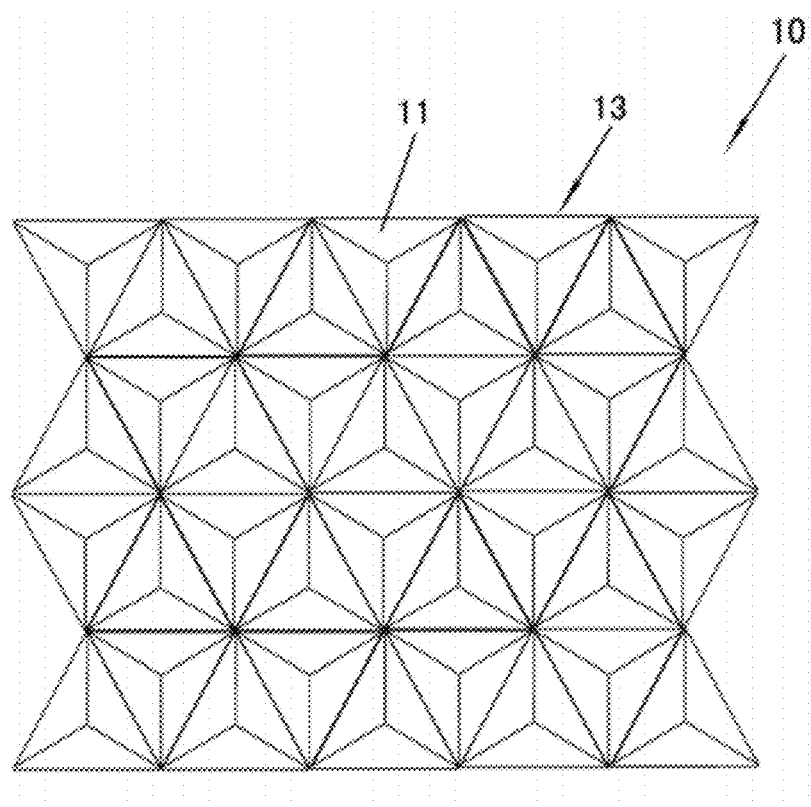
FIG. 4 is a schematic diagram showing an arrangement of three viewing-field display sub-pixels according to an embodiment of the present disclosure.
Figure 5:
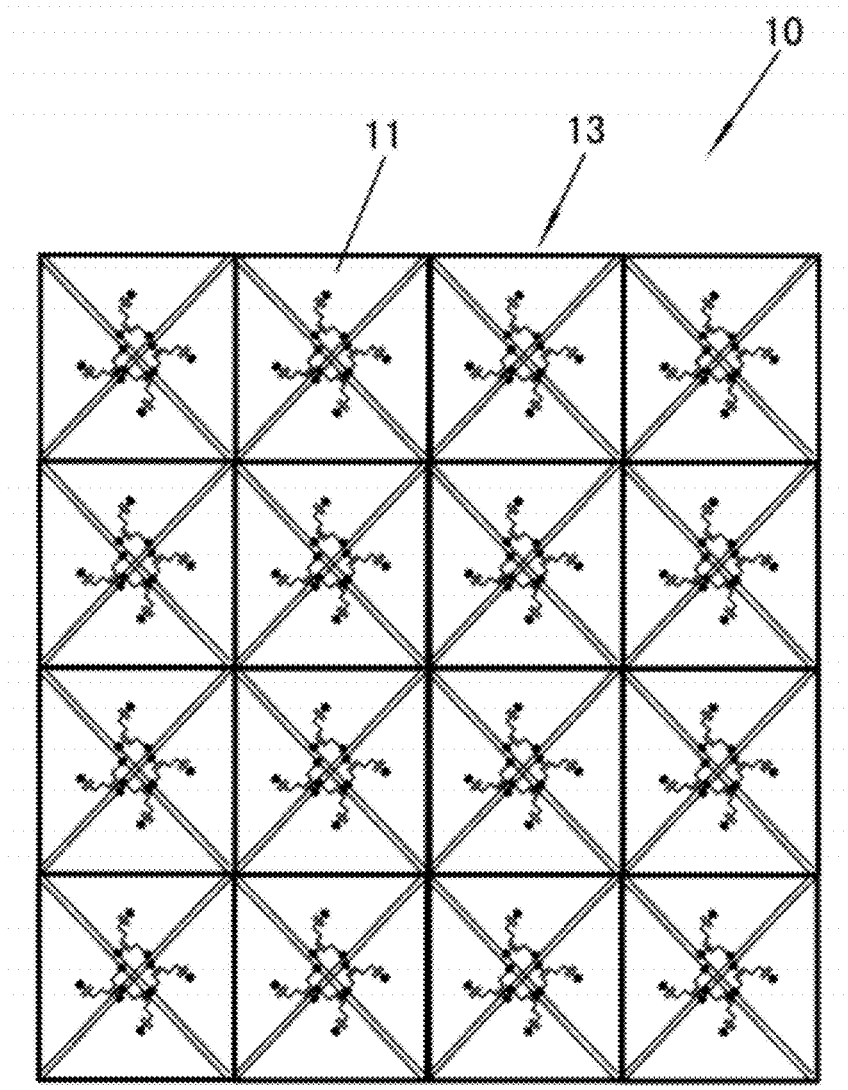
FIG. 5 is a schematic diagram showing an arrangement of four viewing-field display sub-pixels according to an embodiment of the present disclosure.
Figure 6:
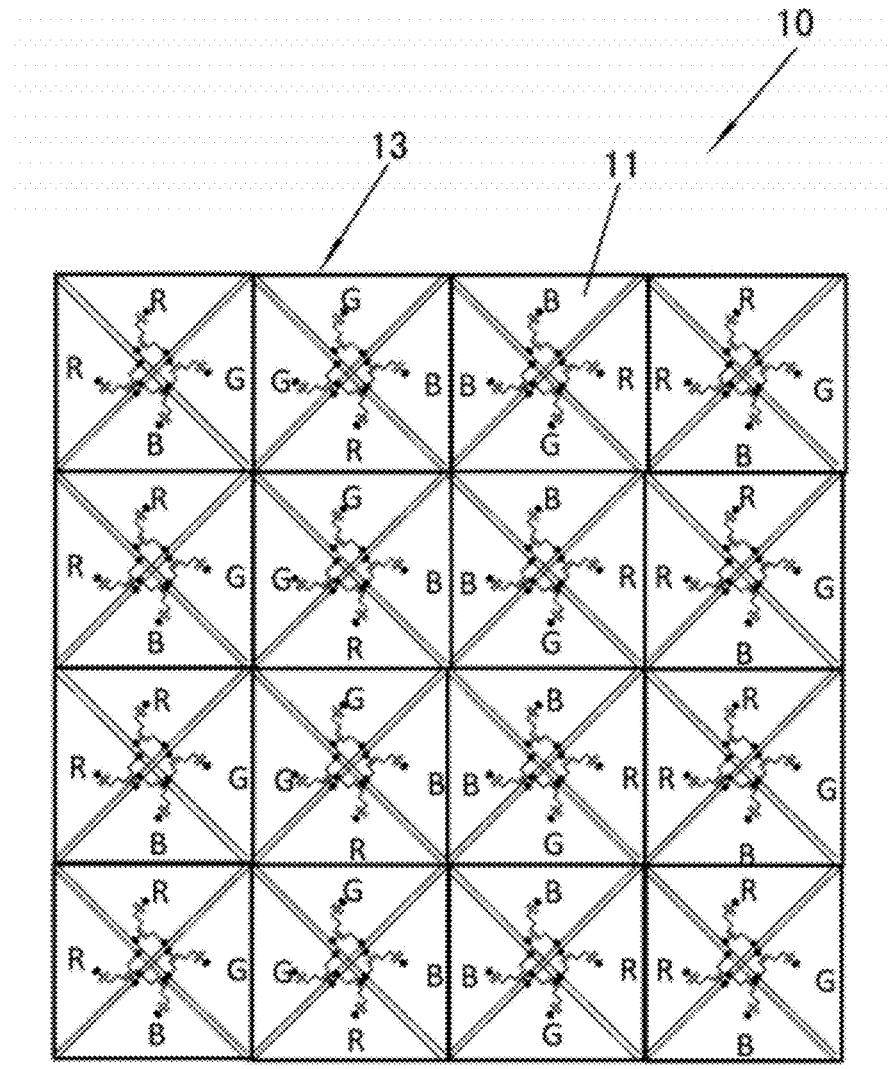
FIGS. 6 to 12 are schematic diagrams showing arrangements of four viewing-field display sub-pixels according to embodiments of the present disclosure.
Figure 7:
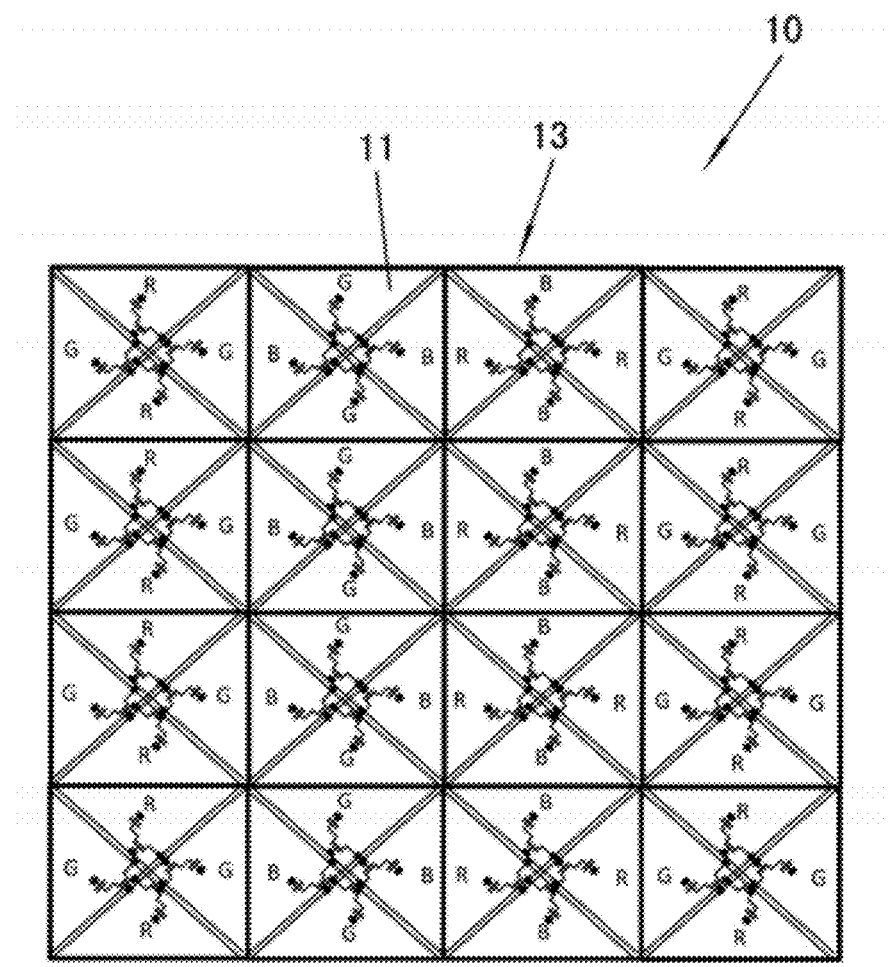
Figure 8:
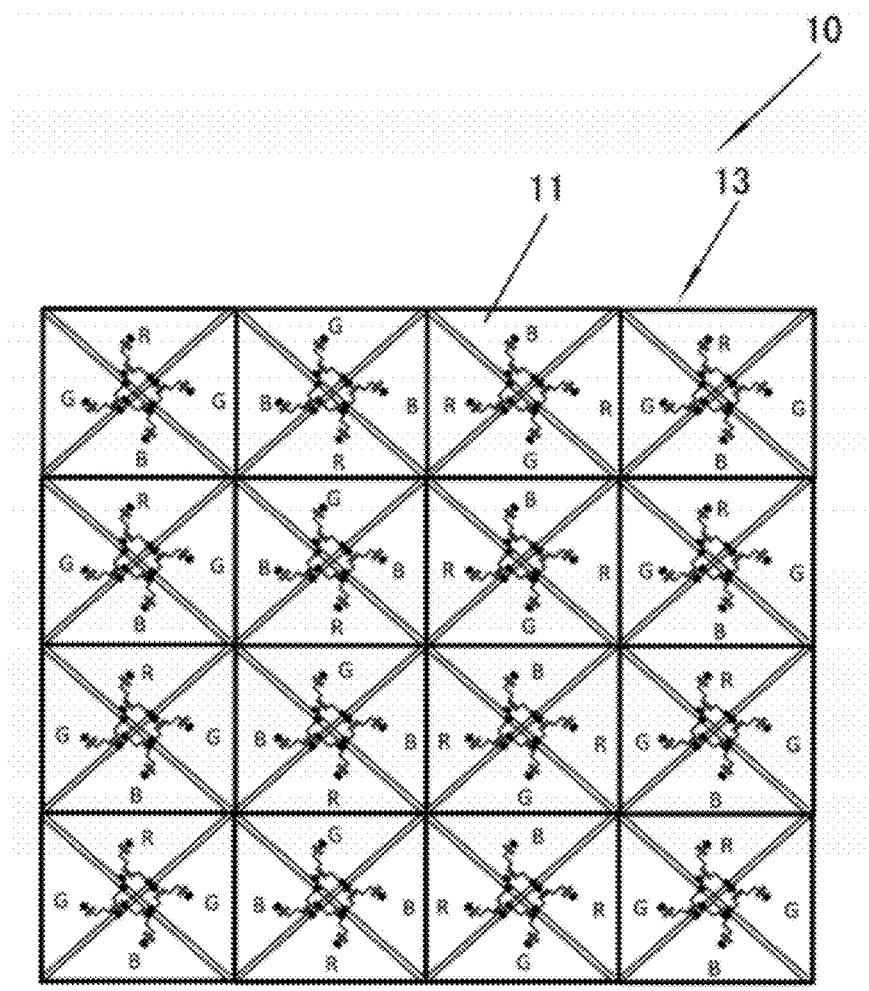
Figure 9:
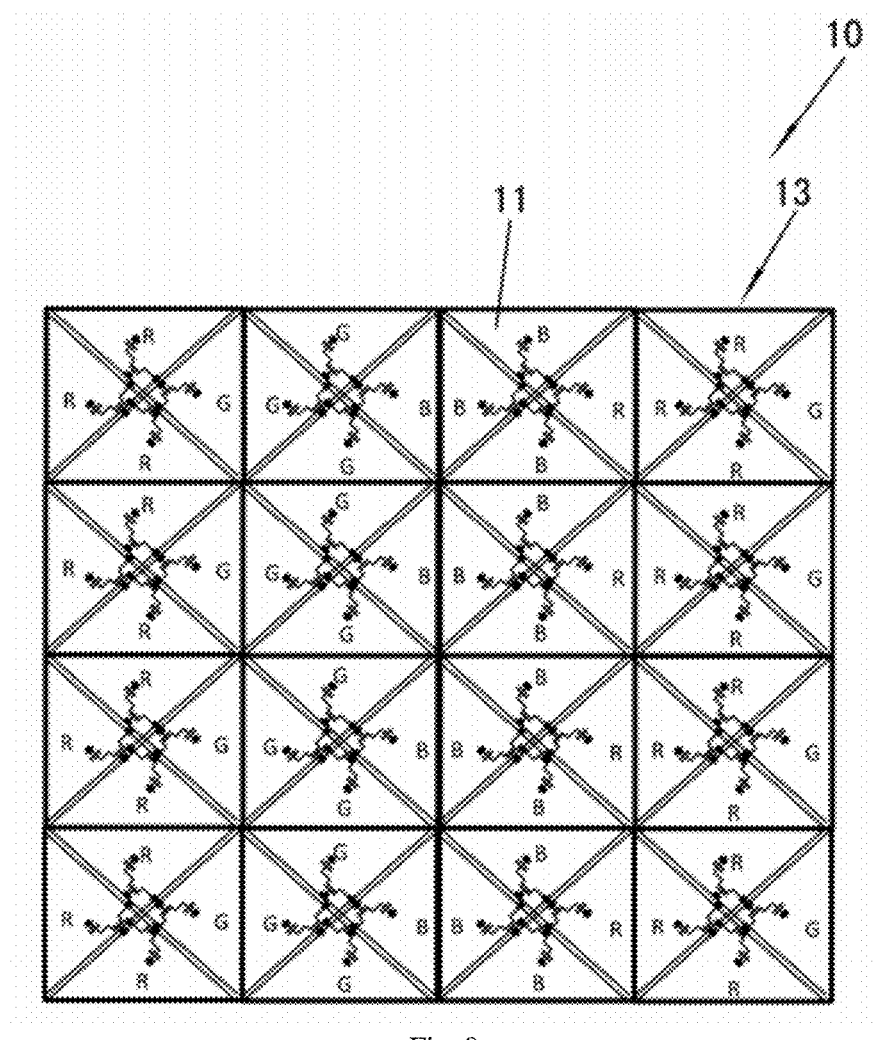

Referring to FIGS. 3 to 5, in some embodiments of the present disclosure, the multiple viewing-field display component is configured to display N viewing fields, where N is an integer greater than or equal to three, each triangular sub-pixel 11 has a vertex 12 and a base 15 opposite to the vertex 12, and N triangular sub-pixels 11 form a polygon 13 having N sides. The vertex 12 of the triangular sub-pixel 11 is located close to a center of the polygon 13 while the bases 15 of the N triangular sub-pixels 11 form N sides of the polygon 13. For example, N may be 3, 4, 5, 6 or the like. The sub-pixel 11 may be an isosceles triangular sub-pixel.

Referring to FIGS. 6 to 12, in some embodiments of the present disclosure, the sub-pixels 11 of each multiple viewing-field pixel 10 corresponding to the N viewing fields form M polygons 13, and M sub-pixels 11 of the M polygons 13 located at the same angle orientation or clock position with respect to the centers of the polygons 13 are sub-pixels having different colors. The M polygons 13 formed by the sub-pixels 11 of each multiple viewing-field pixel 10 corresponding to the N viewing fields may be arranged adjacent to each other, that is, the each multiple viewing-field pixel 10 may include M polygons 13 adjacent to each other.

Referring to FIGS. 4 and 5, in some embodiments of the present disclosure, the polygon 13 formed of N triangular sub-pixels 11 and having N sides is a substantially regular polygon, for example, an equilateral triangle, a square, a regular pentagon, a regular hexagon or the like. In addition, the polygon 13 formed of N triangular sub-pixels 11 and having N sides may have other suitable shapes.

Referring to FIGS. 6 to 12, in some embodiments of the present disclosure, the M polygons 13 formed by the sub-pixels 11 of each multiple viewing-field pixel 10 corresponding to the N viewing fields are arranged in a row or column; alternatively, the M polygons 13 formed by the sub-pixels 11 of each multiple viewing-field pixel 10 corresponding to the N viewing fields are arranged in a substantially L shape or V shape.

Referring to FIGS. 6 to 12, in some embodiments of the present disclosure, the sub-pixels 11 of each multiple viewing-field pixel 10 corresponding to one of the viewing fields comprises are following three sub-pixels: a R sub-pixel having a red color, a G sub-pixel having a green color and a B sub-pixel having a blue color; or the sub-pixels 11 of each multiple viewing-field pixel 10 corresponding to one of the viewing fields comprises are following four sub-pixels: a R sub-pixel, a G sub-pixel, a B sub-pixel and a Y sub-pixel having a yellow color; or the sub-pixels 11 of each multiple viewing-field pixel 10 corresponding to one of the viewing fields comprises are following four sub-pixels: a R sub-pixel, a G sub-pixel, a B sub-pixel and a W sub-pixel having a white color.

In examples shown in FIGS. 6 to 9, the sub-pixels 11 of each multiple viewing-field pixel 10 corresponding to one of the viewing fields are following three sub-pixels: a R sub-pixel, a G sub-pixel and a B sub-pixel; N is equal to four, and M is equal to three; and the three M polygons 13 formed by the sub-pixels 11 of each multiple viewing-field pixel 10 corresponding to the four viewing fields are arranged in a row or column. For example, the sub-pixels 11 of three polygons 13 arranged in a first row but first to third columns form one multiple viewing-field pixel 10; in one multiple viewing-field pixel 10, three sub-pixels 11 of the three polygons 13 located at the same angle orientation or clock position with respect to the centers of the polygons 13 are R sub-pixel, G sub-pixel and B sub-pixel. For example, three sub-pixels 11 located at 12 clock position are respectively R sub-pixel, G sub-pixel and B sub-pixel. In the example, one multiple viewing-field pixel 10 forms a minimum sub-pixel arrangement cycle.

Figure 10:
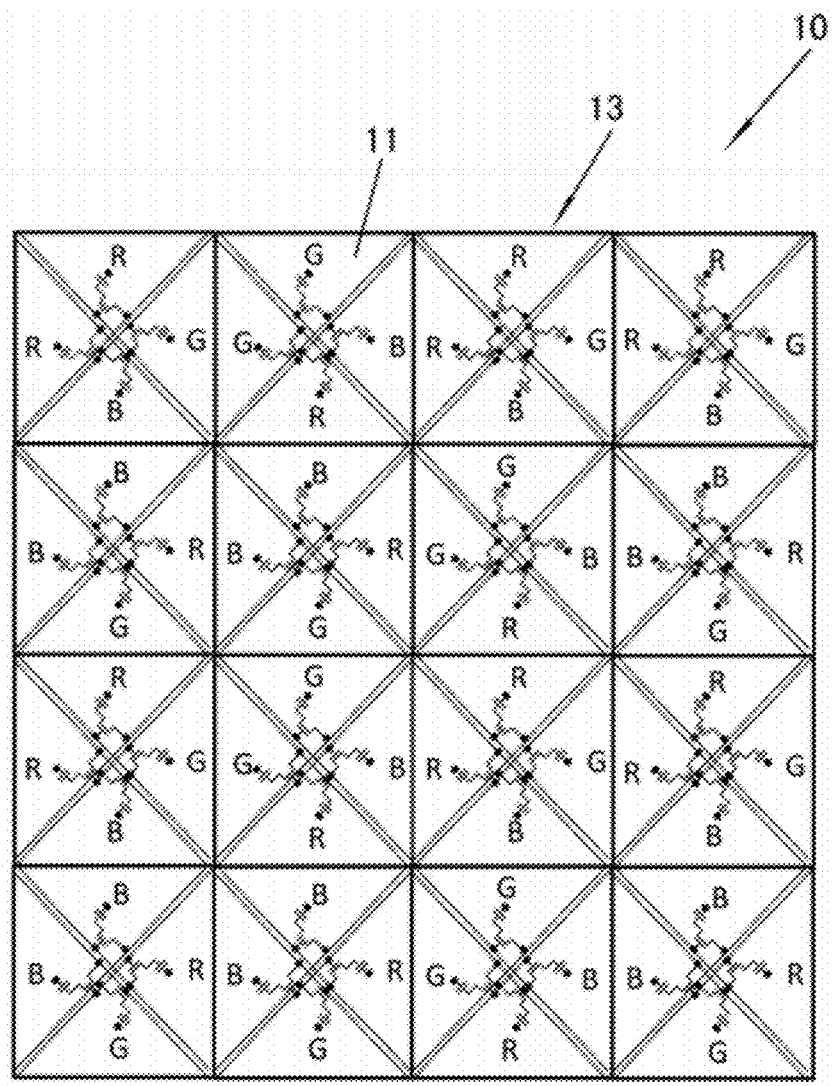
Figure 11:
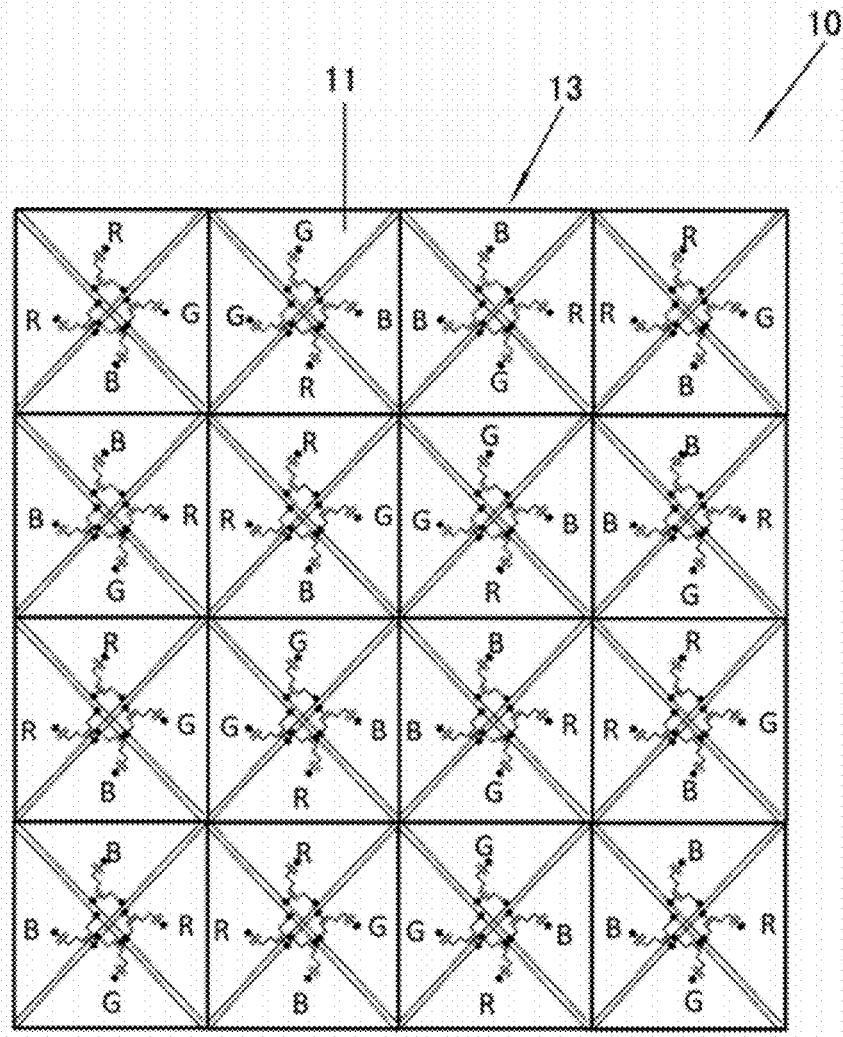

In examples shown in FIGS. 10 to 11, the sub-pixels 11 of each multiple viewing-field pixel 10 corresponding to one of the viewing fields comprises are following three sub-pixels: a R sub-pixel, a G sub-pixel and a B sub-pixel; N is equal to four, and M is equal to three; and the M polygons 13 formed by the sub-pixels 11 of each multiple viewing-field pixel 10 corresponding to the N viewing fields are arranged in a substantially L shape or V shape. For example, the sub-pixels 11 of three polygons 13 arranged in a first row and a second column, in the first row and a first column, and in a second row and a first column form one multiple viewing-field pixel 10, and the sub-pixels 11 of three polygons 13 arranged in the first row and a third column, in the second row and the third column, and in the second row and the second column form another multiple viewing-field pixel 10. In one multiple viewing-field pixel 10, three sub-pixels 11 of the three polygons 13 located at the same angle orientation or clock position with respect to the centers of the polygons 13 are R sub-pixel, G sub-pixel and B sub-pixel. For example, three sub-pixels 11 located at 12 clock position are respectively R sub-pixel, G sub-pixel and B sub-pixel. M polygons 13 formed by the sub-pixels 11 of one multiple viewing-field pixel 10 and arranged in the substantially L shape or V shape and M polygons 13 formed by the sub-pixels 11 of another multiple viewing-field pixel 10 and arranged in the substantially L shape or V shape constitute a parallelogram or rectangle, which forms a minimum sub-pixel arrangement cycle. In examples shown in FIGS. 10 to 11, M polygons 13 formed by the sub-pixels 11 of one multiple viewing-field pixel 10 and arranged in the substantially L shape or V shape and M polygons 13 formed by the sub-pixels 11 of another multiple viewing-field pixel 10 and arranged in the substantially L shape or V shape constitute a rectangle, which forms a minimum sub-pixel arrangement cycle.

Figure 12:
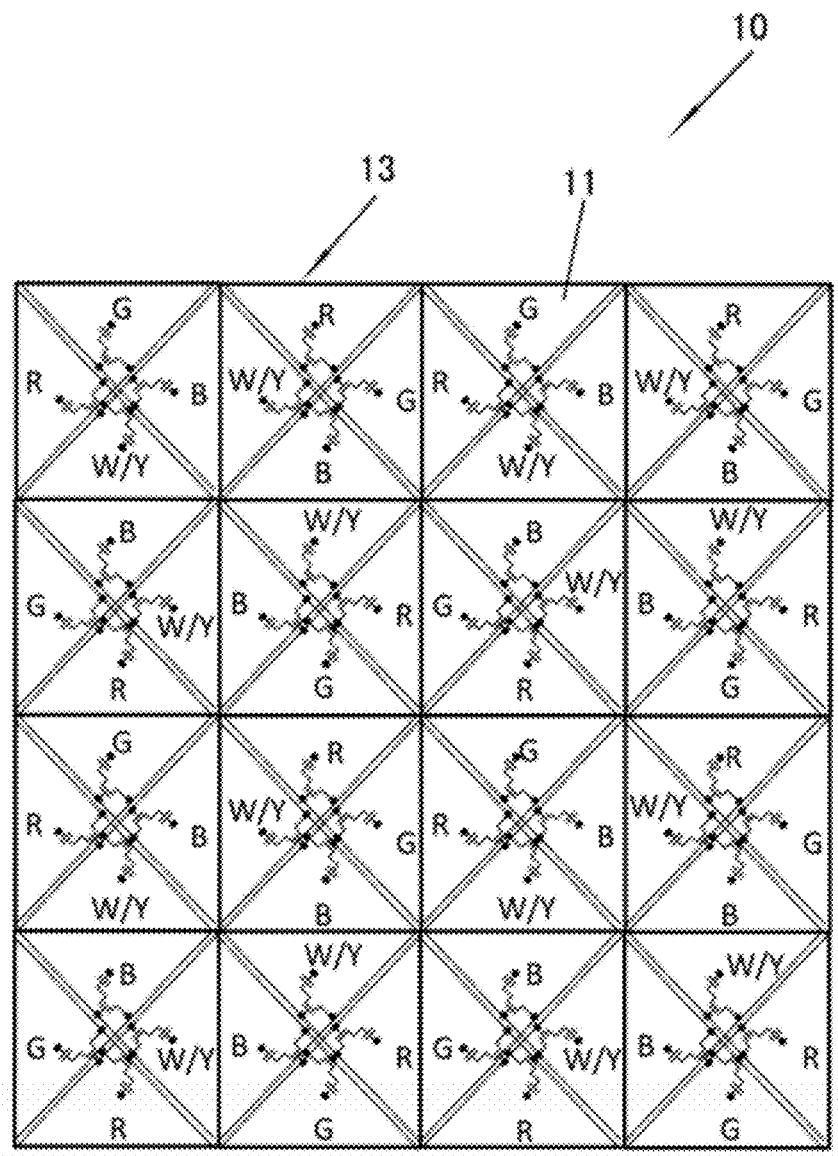

In an example shown in FIG. 12, the sub-pixels 11 of each multiple viewing-field pixel 10 corresponding to one of the viewing fields comprises are following four sub-pixels: a R sub-pixel, a G sub-pixel, a B sub-pixel and a Y sub-pixel, or the sub-pixels of each multiple viewing-field pixel corresponding to one of the viewing fields comprises are following four sub-pixels: a R sub-pixel, a G sub-pixel, a B sub-pixel and a W sub-pixel; N is equal to four, and M is equal to four; and the four polygons 13 formed by the sub-pixels 11 of each multiple viewing-field pixel 10 corresponding to the four viewing fields are arranged in a square shape. In one multiple viewing-field pixel 10, four sub-pixels 11 of the four polygons 13 located at the same angle orientation or clock position with respect to the centers of the polygons 13 are respectively R sub-pixel, G sub-pixel, B sub-pixel and W/Y sub-pixel. For example, four sub-pixels 11 located at 12 clock position are respectively R sub-pixel, G sub-pixel, B sub-pixel and W/Y sub-pixel. In the example, one multiple viewing-field pixel 10 forms a minimum sub-pixel arrangement cycle. For example, the sub-pixels 11 of four polygons 13 arranged in a first row and a first column, in the first row and a second column, in a second row and the first column and in the second row and the second column form one multiple viewing-field pixel 10.

In embodiments of the present disclosure, sub-pixels 11 of each multiple viewing-field pixel 10 corresponding to a plurality of viewing fields may be arranged in any suitable shape or pattern.

Referring to FIGS. 13 and 14, in some embodiments of the present disclosure, when viewed in a direction perpendicular to the grating or patterned shielding layer 170, a peripheral edge of each of the plurality of light transmission regions or openings 171 is arranged to surround a center of a corresponding polygon 13. In an example, when viewed in a direction perpendicular to the grating patterned shielding layer 170, a center of each of the plurality of light transmission regions or openings 171 may substantially coincide with the center of the corresponding polygon 13. Each of the plurality of light transmission regions 17 may have a shape in form of one of square, circle, triangle, ellipse, or other polygon. In some embodiments of the present disclosure, each of the plurality of light transmission regions or openings 171 is formed into a polygon, and the number of sides of the polygon formed by the light transmission region 171 is equal to that of sides of the polygon 13 formed of the sub-pixels 11, and the sides of the polygon formed by the light transmission region 171 are substantially parallel to corresponding sides of the polygon 13 formed of the sub-pixels 11 respectively. For example, the polygon formed by the light transmission region or opening 171 and the polygon 13 formed of the sub-pixels 11 are similar polygons. In some embodiments of the present disclosure, an area of each of the plurality of light transmission regions or openings 171 is 0.25% to 36% of that of the polygon 13 formed of the sub-pixels 11. As shown in FIG. 13, when viewed in a direction perpendicular to the grating or patterned shielding layer 170, the sub-pixels 11 for one viewing field are located at the same side with respect to the plurality of light transmission regions or openings 171.

Referring to FIGS. 13 and 14, a patterned shielding layer 170 for a multiple viewing-field display apparatus according to embodiments of the present disclosure is configured to form a plurality of viewing fields by light coming from multiple viewing-field pixels. The grating or patterned shielding layer 170 comprises an area for display (for example, an area corresponding to pixel regions), and the area for display comprises a plurality of light transmission regions or openings 171 arranged in an array and an opaque region 172 formed by the rest of the area for display. If the area for display is divided by straight lines into a plurality of equal regular polygons arranged in an array, a peripheral edge of each of the plurality of light transmission regions or openings 171 is arranged to surround a center of a corresponding regular polygon. For example, a center of each of the plurality of light transmission regions or openings 171 may substantially coincide with the center of the corresponding regular polygon. Each of the plurality of light transmission regions or openings 171 may have a shape in form of one of square, circle, triangle and ellipse or other suitable shape.

In an example of the present disclosure, referring to FIGS. 13 and 14, each of the plurality of light transmission regions or openings 171 is formed into a polygon, and sides of the polygon formed by the light transmission region or opening 171 are equal in number to and substantially parallel to those of the corresponding regular polygon.

In an example according to the present disclosure, as shown in FIG. 14, the regular polygon is a regular triangle, and the straight lines comprise a plurality of first straight lines 181, a plurality of second straight lines 182 and a plurality of third straight lines 183. The plurality of first straight lines 181 are arranged in parallel with each other and equidistantly spaced apart from each other at an interval. The plurality of second straight lines 182 are arranged in parallel with each other and equidistantly spaced apart from each other at an interval, and the second straight lines 182 are arranged at an angle of 60 degrees with respect to the first straight lines 181. The plurality of third straight lines 183 are arranged in parallel with each other and equidistantly spaced apart from each other at an interval, the third straight lines 183 are arranged at an angle of 60 degrees with respect to the second straight line 182 and intersect the second straight line 182 at respective points on the first straight lines 181, and the interval between second straight lines 182 is equal to that between the third straight lines 183.

In another example according to the present disclosure, as shown in FIG. 13, as shown in FIG. 13, the regular polygon is a square, and the straight lines comprises a plurality of first straight lines 181 and a plurality of second straight lines 182. The plurality of first straight lines 181 are arranged in parallel with each other and equidistantly spaced apart from each other at an interval. The plurality of second straight lines are arranged in parallel with each other and equidistantly spaced apart from each other at an interval, the second straight lines 182 are arranged at an angle of 90 degrees with respect to the first straight lines 181, and the interval between the first straight lines 181 is equal to that between the second straight lines 182.

Figure 15:
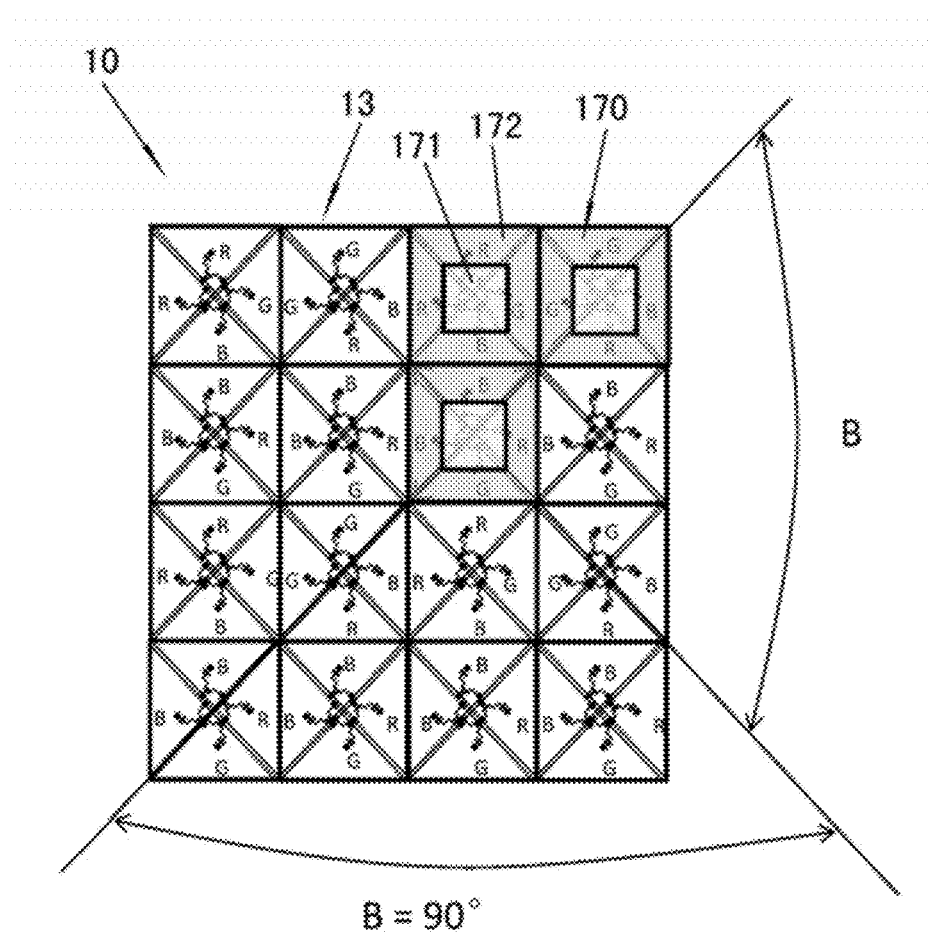
FIG. 15 is a schematic diagram of a four viewing-field display apparatus formed by the triangular pixels according to an embodiment of the present disclosure.
Figure 16:
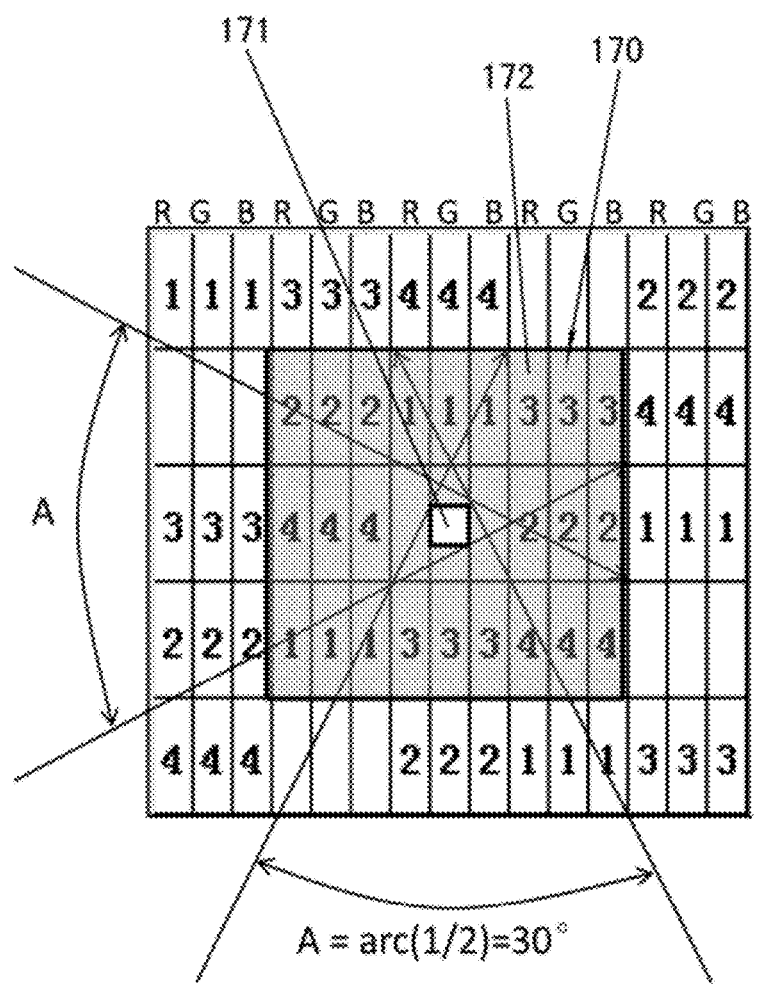
FIG. 16 is a schematic diagram of a four viewing-field display apparatus formed by traditional pixels, as a comparison example.

FIG. 15 shows a display effect of a four viewing-field display apparatus configured by triangular pixels according to embodiments of the present disclosure, while FIG. 16 shows a display effect of a four viewing-field display apparatus configured by traditional pixels, as a comparison example.

In the comparison example shown in FIG. 16, one four viewing-field pixel corresponds to one light transmission region or opening 171 which is a square, a length of a side of the square is one third (⅓) of a length of a sub-pixel, and an area of the square is equal to one third (⅓) of the length of the sub-pixel multiplied by one third (⅓) of the length of the sub-pixel, that is, is equal to one ninth (⅑) of the square of the length of the sub-pixel.

In the embodiment of the present disclosure shown in FIG. 15, one four viewing-field pixel corresponds to three light transmission regions or openings 171, sizes of which are not limited. Generally, the light transmission region or opening 171 is a square, a length of a side of which is one fourth (¼) of a length of a base of a sub-pixel, and an area of which is equal to three times of one fourth (¼) of the length of the base of sub-pixel multiplied by one fourth (¼) of the length of the base of the sub-pixel, that is, is equal to 3/16 of the square of the length of the base of the sub-pixel. The length of the base of the sub-pixel according to embodiments of the present disclosure is substantially equal to the length of the traditional sub-pixel, thus, in embodiments of the present disclosure, there are greater aperture ratio and higher brightness for the four viewing-field display. Further, a visual angle A (30 degrees) in the comparison example shown in FIG. 16 is less than a visual angle B (90 degrees) in the embodiment of the present disclosure shown in FIG. 15.

In the comparison example shown in FIG. 16, one four viewing-field pixel occupies a region where five squares are located; while in the embodiment shown in FIG. 15, one four viewing-field pixel occupies a region where three squares are located, thus the four viewing-field display apparatus according to embodiments of the present disclosure has a greater resolution.

In embodiments of the present disclosure, a triangular sub-pixel is applied in cooperation with a corresponding grating or patterned shielding layer, so high brightness and low crosstalk may be achieved for multiple viewing-field display under control of corresponding signals for multiple viewing-fields.

With the multiple viewing-field display apparatus according to embodiments of the present disclosure, different displayed contents may be viewed in different directions without any interference therebetween. For example, the multiple viewing-field display apparatus may be applicable in game fields, for example, multiple persons are allowable to play mahjong or poker on one flat panel display.

The above described contents are only exemplary embodiments of the present disclosure, and the scope of the present invention is not limited to those. Various changes or modifications, which may be easily envisaged by those skilled in the art in these embodiments without departing from the principles and spirit of the present disclosure, are intended to be covered within the scope of the present invention. Therefore, the scope of the present invention is defined in the claims and their equivalents.

What is claimed is:

1. A multiple viewing-field display component, comprising:
    a plurality of multiple viewing-field pixels each comprising a plurality of sub-pixels corresponding to a plurality of viewing fields, each sub-pixel having a substantially triangular shape,
    wherein N triangular sub-pixels being in a one-to-one correspondence to N viewing fields form one polygon having N sides, where N is an integer greater than or equal to three.

2. The multiple viewing-field display component according to claim 1, wherein:
    the multiple viewing-field display component is configured to display the N viewing fields, and
    each triangular sub-pixel has a vertex and a base opposite to the vertex, and N triangular sub-pixels form a polygon having N sides, such that the vertexes of the triangular sub-pixels are located close to a center of the polygon and the bases of the triangular sub-pixels form N sides of the polygon.

3. The multiple viewing-field display component according to claim 2, wherein:
    the sub-pixels of each multiple viewing-field pixel corresponding to the N viewing fields form M polygons, and M sub-pixels of the M polygons located at the same angle orientation or clock position with respect to respective centers of the polygons are sub-pixels having different colors.

4. The multiple viewing-field display component according to claim 3, wherein:
    the M polygons formed by the sub-pixels of each multiple viewing-field pixel corresponding to the N viewing fields are arranged adjacent to each other.

5. The multiple viewing-field display component according to claim 4, wherein:
    the M polygons formed by the sub-pixels of each multiple viewing-field pixel corresponding to the N viewing fields are arranged in a row or a column.

6. The multiple viewing-field display component according to claim 4, wherein:
    the M polygons formed by the sub-pixels of each multiple viewing-field pixel corresponding to the N viewing fields are arranged in a substantially L shape or V shape.

7. The multiple viewing-field display component according to claim 3, wherein:
    the sub-pixels of each multiple viewing-field pixel corresponding to one of the viewing fields comprises three sub-pixels including a R sub-pixel, a G sub-pixel and a B sub-pixel;
    N is equal to four, and M is equal to three; and the M polygons formed by the sub-pixels of each multiple viewing-field pixel corresponding to the N viewing fields are arranged in a row or column.

8. The multiple viewing-field display component according to claim 3, wherein:
the sub-pixels of each multiple viewing-field pixel corresponding to one of the viewing fields comprises three sub-pixels including a R sub-pixel, a G sub-pixel and a B sub-pixel;
N is equal to four, and M is equal to three; and
the M polygons formed by the sub-pixels of each multiple viewing-field pixel corresponding to the N viewing fields are arranged in a substantially L shape or V shape.

9. The multiple viewing-field display component according to claim 8, wherein:
the M polygons formed by the sub-pixels of one multiple viewing-field pixel and arranged in the substantially L shape or V shape and the M polygons formed by the sub-pixels of another multiple viewing-field pixel and arranged in the substantially L shape or V shape constitute a parallelogram or a rectangle, which forms a minimum sub-pixel arrangement cycle.

10. The multiple viewing-field display component according to claim 2, wherein:
the sub-pixels of each multiple viewing-field pixel corresponding to one of the viewing fields comprises four sub-pixels including a R sub-pixel, a G sub-pixel, a B sub-pixel and a Y sub-pixel, or the sub-pixels of each multiple viewing-field pixel corresponding to one of the viewing fields comprises four sub-pixels including a R sub-pixel, a G sub-pixel, a B sub-pixel and a W sub-pixel;
N is equal to four, and M is equal to four; and
the M polygons formed by the sub-pixels of each multiple viewing-field pixel corresponding to the N viewing fields are arranged in a square shape.

11. The multiple viewing-field display component according to claim 2, further comprising:
a patterned shielding layer configured such that light coming from the plurality of multiple viewing-field pixels and passing through the patterned shielding layer forms the plurality of viewing fields, the patterned shielding layer having a plurality of light transmission regions.

12. The multiple viewing-field display component according to claim 11, wherein:
when viewed in a direction perpendicular to the patterned shielding layer, a peripheral edge of each of the plurality of light transmission regions is arranged to surround a center of a corresponding one of the polygons.

13. The multiple viewing-field display component according to claim 12, wherein:
when viewed in a direction perpendicular to the patterned shielding layer, a center of each of the plurality of light transmission regions substantially coincides with the center of the corresponding polygon.

14. The multiple viewing-field display component according to claim 12, wherein:
each of the plurality of light transmission regions is formed into a polygon, and sides of the polygon formed by the light transmission region are equal in number to and substantially parallel to the sides of the polygon formed of the sub-pixels.

15. The multiple viewing-field display component according to claim 12, wherein:
an area of each of the plurality of light transmission regions is 0.25% to 36% of an area of the polygon formed of the sub-pixels.

16. The multiple viewing-field display component according to claim 12, wherein:
when viewed in a direction perpendicular to the patterned shielding layer, the sub-pixels for one viewing field are located at the same side with respect to the plurality of light transmission regions respectively.

17. The multiple viewing-field display component according to claim 11, wherein the patterned shielding layer comprises an area for display, and the area for display comprises a plurality of light transmission regions arranged in an array, and
wherein the area for display includes a plurality of display area regions of identical regular polygons arranged in an array divided by straight lines, and a peripheral edge of each of the plurality of light transmission regions is arranged to surround a center of a corresponding one of the regular polygons.

18. The multiple viewing-field display component according to claim 17, wherein:
a center of each of the plurality of light transmission regions substantially coincides with the center of the corresponding one of the regular polygons.

19. The multiple viewing-field display component according to claim 17, wherein:
each of the plurality of light transmission regions is formed into a polygon, and sides of the polygon formed by the light transmission region are equal in number to and substantially parallel to sides of the corresponding regular polygon.

20. The multiple viewing-field display component according to claim 17, wherein:
each of the regular polygons is a regular triangle, and
the straight lines comprise:
a plurality of first straight lines arranged in parallel with each other and equidistantly spaced apart from each other at a first interval;
a plurality of second straight lines arranged in parallel with each other and equidistantly spaced apart from each other at a second interval, the second straight lines being arranged at an angle of 60 degrees with respect to the first straight lines; and
a plurality of third straight lines arranged in parallel with each other and equidistantly spaced apart from each other at a third interval, the third straight lines being arranged at an angle of 60 degrees with respect to the second straight lines, and intersecting the second straight lines at respective points on the first straight lines, the second interval between the second straight lines being equal to the third interval between the third straight lines.

21. The multiple viewing-field display component according to claim 17, wherein:
each of the regular polygons is a square, and
the straight lines comprise:
a plurality of first straight lines arranged in parallel with each other and equidistantly spaced apart from each other at a first interval; and
a plurality of second straight lines arranged in parallel with each other and equidistantly spaced apart from each other at a second interval, the second straight lines being arranged at an angle of 90 degrees with respect to the first straight lines, and the first interval between the first straight lines being equal to the second interval between the second straight lines.

22. A multiple viewing-field display apparatus, comprising the multiple viewing-field display component according to claim 17.

23. A multiple viewing-field display apparatus, comprising the multiple viewing-field display component according to claim 1.

* * * * *